US010268695B2

(12) United States Patent
Belmanu Sadananda et al.

(10) Patent No.: US 10,268,695 B2
(45) Date of Patent: Apr. 23, 2019

(54) SNAPSHOT CREATION (71) Applicant: HEWLETT PACKARD ENTERPRISE DEVELOPMENT LP, Houston, TX (US)

(72) Inventors: Girish Chandra Belmanu Sadananda, Bangalore (IN); Santosh Bangalore Balaraj, Bangalore (IN); Alastair Slater, Bristol (GB); Subramani Nallusamy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/521,336

(22) PCT Filed: Dec. 15, 2014

(86) PCT No.: PCT/US2014/070403
§ 371 (c)(1),
(2) Date: Apr. 24, 2017

(87) PCT Pub. No.: WO2016/069029
PCT Pub. Date: May 6, 2016

(65) Prior Publication Data
US 2017/0300505 A1    Oct. 19, 2017

(30) Foreign Application Priority Data
Oct. 28, 2014   (IN) .......................... 5370/CHE/2014

(51) Int. Cl.
*G06K 9/00* (2006.01)
*G06F 17/30* (2006.01)
*G06F 11/14* (2006.01)

(52) U.S. Cl.
CPC ........ *G06F 17/30088* (2013.01); *G06F 11/14* (2013.01); *G06F 11/1446* (2013.01);
(Continued)

(58) Field of Classification Search
CPC ......... G06F 17/30088; G06F 17/30162; G06F 17/30371; G06F 17/30174; G06F 12/00;
(Continued)

(56) References Cited

U.S. PATENT DOCUMENTS 6,147,773 A * 11/2000 Taylor .................. G06Q 10/107
358/400
7,035,881 B2   4/2006 Tummala et al.
(Continued)

OTHER PUBLICATIONS

International Search Report & Written Opinion received in PCT Application No. PCT/US2014/070403, dated Jul. 23, 2015, 12 pages.
(Continued)

*Primary Examiner* — Amir Alavi
(74) *Attorney, Agent, or Firm* — Hewlett Packard Enterprise Patent Department (57) ABSTRACT In one example an updated snapshot delta value is computed upon occurrence of a new transaction. The new transaction is a data modification operation performed on data blocks of the storage device. Further, the delta value indicates at least one of volume of data modified since creation of a reference snapshot and number of transactions performed since the creation. Subsequently, the updated snapshot delta value is compared with a corresponding threshold value. The threshold value is at least one of a predetermined volume of data modified and a predetermined number of transactions. A snapshot action is subsequently performed based on the comparison.

19 Claims, 5 Drawing Sheets

(52) U.S. Cl.
CPC .... *G06F 17/30162* (2013.01); *G06F 11/1461* (2013.01); *G06F 11/1474* (2013.01); *G06F 2201/81* (2013.01); *G06F 2201/815* (2013.01); *G06F 2201/84* (2013.01)

(58) Field of Classification Search
CPC .......... G06F 12/16; G06F 11/14; G06F 11/00; G06F 11/451
See application file for complete search history.

(56) References Cited

U.S. PATENT DOCUMENTS

| | | | |
|---|---|---|---|
| 7,849,057 | B1 | 12/2010 | Kazar et al. |
| 8,103,622 | B1 | 1/2012 | Karinta |
| 2006/0136771 | A1 | 6/2006 | Watanabe |
| 2007/0198605 | A1 | 8/2007 | Saika |
| 2008/0228879 | A1 | 9/2008 | Cardone et al. |
| 2011/0231698 | A1* | 9/2011 | Zlati ................... G06F 11/3006 714/3 |
| 2011/0238630 | A1* | 9/2011 | Nishigaki ......... G06F 17/30368 707/679 |
| 2014/0122853 | A1 | 5/2014 | Ruelas |
| 2014/0149698 | A1 | 5/2014 | Ezra et al. |
| 2014/0372394 | A1* | 12/2014 | Frankel ................. G06F 3/0619 707/703 |
| 2016/0070726 | A1* | 3/2016 | Macnicol .......... G06F 17/30315 707/691 |
| 2017/0116220 | A1* | 4/2017 | Wong ................ G06F 17/30174 |
| 2017/0300505 | A1* | 10/2017 | Belmanu Sadananda ................... G06F 17/30088 |
| 2018/0089033 | A1* | 3/2018 | Tamura ............... G06F 11/1451 |

OTHER PUBLICATIONS

NEXSAN, "Snapshot and Replication Nexsan E-Series," (Research Paper), Technical Brief, 2 pages, retrieved on Sep. 2, 2014 at http://www.nexsan.com/library/technicalbriefs/Snap_Rep_TB.pdf.

* cited by examiner

SNAPSHOT CREATION

BACKGROUND

With increase in data generation and data processing capabilities in enterprises, an ever-increasing amount of data are being produced which is stored for short, medium, or long periods. Enterprises implement data management through a file system or a block storage system. Storing the data using a file system involves performing file related actions, at a host level through an application. Examples of the actions include creating a file, adding data in the file, and deleting or archiving the file. Each of these actions results into a file system input or output (I/O). A given I/O to a file system generally includes multiple storage disk I/O requests which are acted upon by the block storage system. The block storage systems further create snapshots, i.e., a point in time image of the data stored in the storage disk. The snapshots can be used for various purposes, such as backup, creating a checkpoint for restoring the state of an application, a source for data mining.

BRIEF DESCRIPTION OF FIGURES

The detailed description is described with reference to the accompanying figures. In the figures, the left-most digit(s) of a reference number identifies the figure in which the reference number first appears. The same numbers are used throughout the figures to reference like features and components. Systems and/or methods, in accordance with examples of the present subject matter are now described, by way of example, and with reference to the accompanying figures, in which.

DETAILED DESCRIPTION

Systems and methods for snapshot creation are described herein. The methods can be implemented in various systems, such as computing devices connected through various networks. Typically, data is stored in a storage device and managed through a file system. A file system may be understood as an abstraction for organizing and storing data, as files. The file system may also facilitate in controlling the manner in which the data is stored, modified, and retrieved from the storage device.

The file systems periodically may create snapshots, i.e., a point in time image of the file system. Such snapshots may be later used for creating a copy of the data stored within the file system. The file system may create the snapshots for various data processing and storage purposes, such as backup, creating a checkpoint for restoring state of an application, data mining, and software debugging and testing. For instance, in case of a system crash or data getting corrupted, the snapshots can be used for restoring the data. Typically, the snapshots are created by copying the data at each predetermined point in time to form an image of the data within the file system. The snapshot thus obtained, is saved in a snapshot volume on the storage disk. The point in time at which the snapshot is created is typically predetermined and may be based on a variety of conditions, for example, a number of days and time elapsed since a last snapshot creation. For instance, the file system may be set to periodically create snapshots at a predetermined time intervals.

Creating the snapshots periodically, may result in unpredictable data loss. For instance, in case the system is set to create snapshots every five hours and the system crashes in between two cycles of snapshot creation, say, in the fourth hour, the file system will be able to restore the data based on the last available snapshot created. In case if a large amount of data is modified since the last snapshot creation, it would result in an unpredictable data loss. The extent of data loss in such a case may not be acceptable from a service point of view.

Alternately, it may also happen that few or no modifications may happen over the data within the periodic interval. In such a case, the snapshot would still be created even though the modifications on the base data are not significant. Later snapshot thus created would more or less be representative of the previously available data. The later snapshot would however have to be stored. Over a period of time, the number of snapshots representing little or no modifications may be maintained in the storage device. This unnecessarily occupies space in the storage device. As a result, when significant modifications do occur, there may not be enough storage space available for accommodating the next snapshot. It should also be noted that creating such snapshots periodically may also utilize processing resources unnecessarily.

The present subject matter, describes a system and a method for snapshot creation. The present subject matter facilitates in dynamically creating a snapshot based on number and volume of data write operations performed by the system. The subject matter allows managing snapshots stored in a storage device of the system by dynamically performing snapshot actions, such as creating the snapshot, creating a snapshot at a replicated site, creating a backup of the snapshots, and expiring snapshots based on one or more predefined conditions. For instance, each snapshot action is dynamically performed based on either volume of data modified or number of transactions occurred since a last snapshot action was performed.

In accordance to an example of the present subject matter, the dynamic creation of a snapshot is based on determining the volume of data which has undergone modifications during a transaction being performed by the system. A transaction, also referred to as a system transaction, may be defined as a singular disk write or modification action. For instance, writing data onto data blocks of the storage device of the system may be referred to as a transaction. In the present example, occurrence of a new transaction is determined based on small computer system interface (SCSI) request received from an operating system of the system. Upon occurrence of the transaction, data blocks of the storage device may be analyzed to determine the volume of data written or modified during the transaction.

In one example, one or more snapshot delta values are used to determine when a snapshot action, such as creating the snapshot has to be performed. The snapshot delta value indicates the volume of data modified or the number of transactions occurred since creation of a reference snapshot. The reference snapshot is a snapshot having image of data in reference to which the volume of data modification is being determined. In operation, file system of the system computes an updated snapshot delta value upon occurrence of a new transaction. The updated snapshot delta value is subsequently compared with a corresponding threshold value to determine if the snapshot action corresponding to the snapshot delta value has to be performed. In one example, the threshold value is at least one of a predetermined volume of data modified and a predetermined number of transactions.

In case the updated snapshot delta value is greater than the threshold value, a snapshot action is performed. In one example, the snapshot action corresponding to the snapshot delta value is performed. For instance, if it is determined that a snapshot delta count is greater than the threshold value, a new snapshot is created. The snapshot delta count is subsequently reset to zero. In case the snapshot delta value is less than the threshold value, no action may be taken and the storage system may continue tracking the transactions being performed.

The present subject matter thus provides systems and methods for minimizing data loss caused due to delay in snapshot creation and optimizing storage space utilization. For example, an acceptable limit may be prescribed for modifications which have been carried out on a volume of data. Only when the modifications are more than the acceptable limit as prescribed by a threshold value, would the snapshot be created. As will be understood based on the above description, the data loss is minimized by dynamically creating a new snapshot based on the snapshot delta count indicating the volume of data modified or number of transactions performed since a previous snapshot was created. Creating the new snapshot based on the snapshot delta count ensures that a substantial amount of data modifications are captured in the new snapshot. This is because whenever the volume of modified data, being tracked using the snapshot delta count, exceeds a preset threshold value, a snapshot is created. Similarly whenever the number of transactions, being tracked using the snapshot delta count, exceeds a preset threshold value, the new snapshot is created. Further, creating the snapshots based on the snapshot delta count ensures in minimizing storage space wastage caused due to creation of snapshots having same or similar data as the snapshots are now created when a significant volume of data is modified.

Additionally, using the snapshot delta values, such as a snapshot-replicate value, a snapshot-backup value, and a snapshot-expire value, the reference snapshot stored in the storage device can be easily and dynamically managed. For instance, in case the snapshot-expire value exceeds the corresponding threshold value, the file system may determine that a substantial data of the reference snapshot has been modified and therefore the reference snapshot may be expired.

The above systems and methods are further described in conjunction with FIG. 1 to FIG. 4. It should be noted that the description and figures merely illustrate the principles of the present subject matter. It will thus be appreciated that various arrangements that embody the principles of the present subject matter, although not explicitly described or shown herein, can be devised from the description and are included within its scope. Furthermore, all examples recited herein are for pedagogical purposes to aid the reader in understanding the principles of the present subject matter. Moreover, all statements herein reciting principles, aspects, and examples of the present subject matter, as well as specific examples thereof, are intended to encompass equivalents thereof.

Figure 1A:
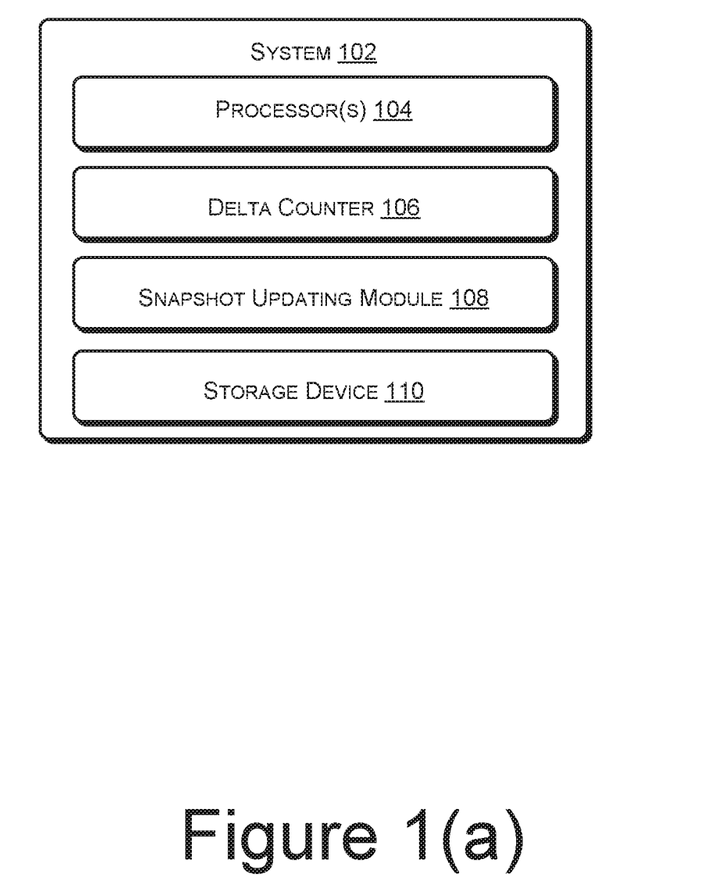
FIG. 1(a) illustrates a block diagram of an example computing system for snapshot creation, in accordance with an example of the present subject matter.

FIG. 1(a) illustrates a block diagram of an example computing system 102 for snapshot creation, in accordance with an example of the present subject matter. The computing system 102 is hereinafter referred to as system 102. The system 102 may be implemented in, for example, desktop computers, multiprocessor systems, personal digital assistants (PDAs), laptops, network computers, cloud servers, minicomputers, mainframe computers, hand-held devices, such as tablets, storage-systems. The system 102 may also be hosting a plurality of applications. The system 102 may further be implemented in a networked environment (not shown in the figure).

The system 102 may include, for example, processor(s) 104, a delta counter 106 communicatively coupled to the processor 104, a snapshot updating module 108 communicatively coupled to the processor 104, and a storage device 110.

The processor(s) 104 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

In operation, the delta counter 106 may compute an updated value of a snapshot delta count upon occurrence of a new transaction. The new transaction includes a data modification operation performed on data blocks of the storage device 118. The value of the snapshot delta count indicates at least one of volume of data modified since a last reset of the snapshot delta count and number of transactions performed since the last reset. In one example, the delta counter 106 may compute the updated value of the snapshot delta count based on volume of data modified during the new transaction. The data may be stored in the storage device 110.

The snapshot updating module 108 may subsequently compare the updated value of the snapshot delta count with a corresponding threshold value. In one example, the threshold value is at least one of a predetermined volume of data modified and a predetermined number of transactions. For instance, in case of a volume based count, the threshold value may be a predetermined percentage, say, 2%, 3%, or 5% of the volume of data stored in the storage device 118. In case of a transaction based count, the threshold value may be a predetermined number, say, 100, 200, or 400.

On determining the updated value of the snapshot delta count to be greater than the threshold value, the snapshot updating module 108 may create a new snapshot.

Figure 1B:
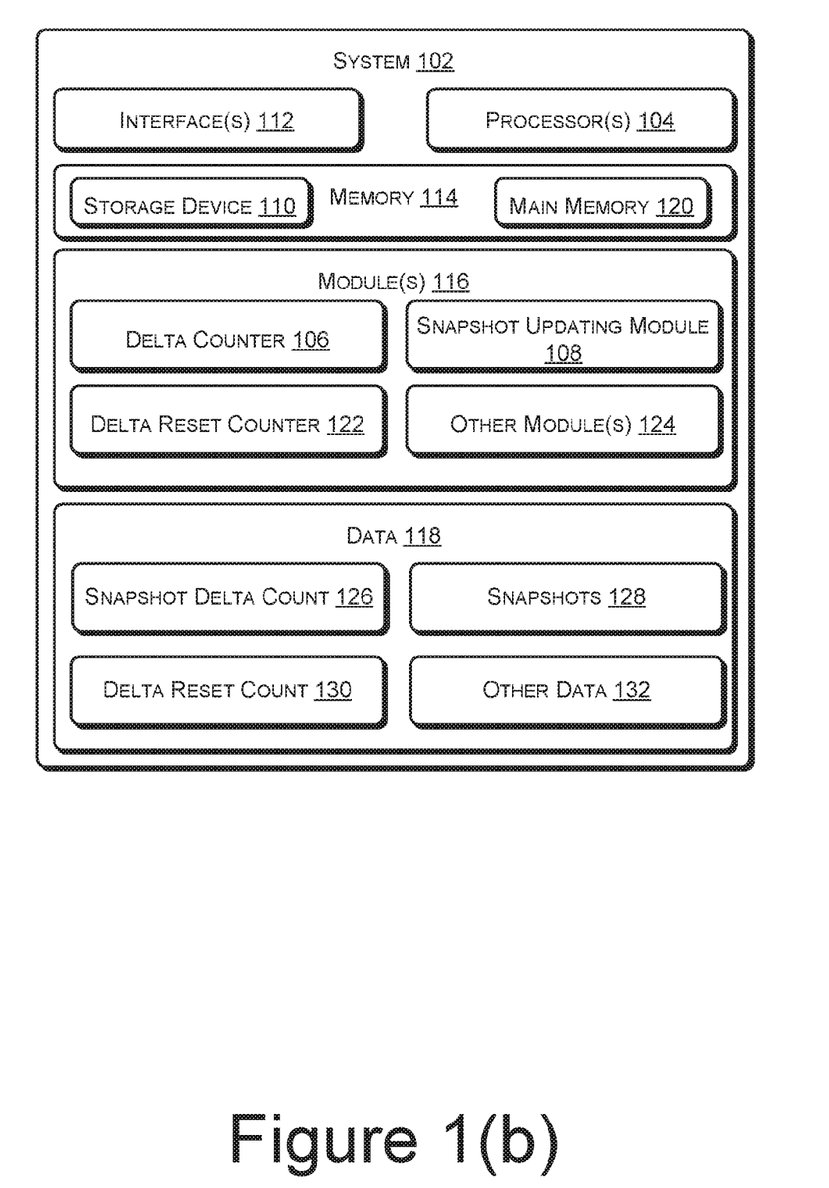
FIG. 1(b) illustrates various example components of the example computing system for snapshot creation, in accordance with an example of the present subject matter.

FIG. 1(b) illustrates various example components of the system 102, in accordance with an example of the present subject matter. The system 102 includes the processor(s) 104, interface(s) 112, memory 114, modules 116, and data 118. The interfaces 112 may include a variety of commercially available interfaces, for example, interfaces for peripheral device(s), such as data input output devices, referred to as I/O devices, interface cards, storage devices, and network devices.

The memory 114 may be communicatively coupled to the processor 104 and may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one example, the memory 114 may include the storage device 110 and main memory 120. The storage device 110, such as hard disks and magnetic tapes may be used for storing content, such as files in the system 102. The main memory 120, such as RAM may be used for temporary storage of content for processing by the system 102.

The modules 116, amongst other things, include routines, programs, objects, components, and data structures, which perform particular tasks or implement particular abstract data types. The modules 116 may also be implemented as, signal processor(s), state machine(s), logic circuitries, and/or any other device or component that manipulate signals based on operational instructions. Further, the modules 116 can be implemented by hardware, by computer-readable instructions executed by a processing unit, or by a combination thereof.

The modules 116 may include the delta counter 106, the snapshot updating module 108, a delta reset counter 122, and other module(s) 124. The other modules 124 may include programs or coded instructions that supplement applications and functions, for example, programs in an operating system of the system 102. Further, the data 118 may include snapshot delta count 126, snapshots 128, delta reset count 130, and other data 132.

The system 102 facilitates dynamically creating a snapshot. The system further facilitates in managing existing snapshots saved in the storage device 110. Dynamically creating the snapshots, such as the snapshots 128 and managing the existing snapshots helps in achieving efficient and smooth working of the system 102. Further, dynamically creating the snapshots minimizes data loss caused due to delay in snapshot creation. In one example, the system 102 may dynamically create the snapshot based upon an updated value of a snapshot delta count indicating at least one of volume of data modified and number of transactions performed since the last reset of the snapshot delta count.

As previously described, the value of the snapshot delta count is dynamically updated to determine when the corresponding snapshot action has to be performed. In one example, the delta counter 106 computes the updated value of the snapshot delta count upon occurrence of a new transaction. As previously described, a transaction is a singular disk write or modification action performed on data blocks of the storage device 110 of the system 102. In one example, the delta counter 106 may determine the occurrence of the new transaction based on small computer system interface (SCSI) request received from an operating system of the system 102.

Upon determining the occurrence of the transaction, the delta counter 106 may compute the updated value of the snapshot delta count. In one example, the value of the snapshot delta count may be updated to indicate number of transactions performed since the last reset of the snapshot delta count. In another example, the value of the snapshot delta count may be updated to indicate volume of data modified since the last reset of the snapshot delta count. In yet another example, both, the volume of data modified and the number of transactions may be used to update the value of the snapshot delta count. In such a case, a volume based snapshot delta count and a transaction based snapshot delta count may be simultaneously updated.

To compute an updated value of the snapshot delta count, the delta counter 106 may obtain a last value of the snapshot delta count from the snapshot delta count 126. The delta counter 106 may then increment the last value of the snapshot delta count by one of the volume of data modified during the new transaction and number of transactions currently occurred, for instance, numeric value one to obtain the updated value of the snapshot delta count. Thus, to compute the snapshot delta count based on the number of transactions, the delta counter 106 may increment the last value of the snapshot delta count by each the numeric value one each time a transaction occurs. For instance, if the last value of the transaction based snapshot delta count is 10 transactions, then on occurrence of the new transaction the delta counter 106 may increment the transaction based snapshot delta count by one to compute the updated value of the transaction based snapshot delta count as 11 transactions.

To compute the update value of the snapshot delta count based on the volume of data modified during the new transaction, the delta counter 106 may determine the volume of data modified. In one example, the delta counter 106 may analyze data blocks of the storage device 110 to determine the volume of data written or modified during the new transaction. For instance, the delta counter 106 may identify data blocks in the storage device 110 that are being modified as writes to the storage device 110 are performed during the transaction. Original data that is being written to is copied into a designated storage pool, say, the snapshots 128 in the storage device 110 that is set aside for creating and storing the snapshots before the original data is overwritten. Thus, before a write is allowed to a data block, an original data block is moved to the snapshots 128 based on the copy-on-write technique being used for snapshot creation.

The delta counter 106 may thus identify the data blocks being modified during the transaction and compute a difference between volume of the identified data blocks before the transaction and volume of the identified data blocks after the transaction. The difference thus computed may be identified as the volume of data modified during the new transaction. The delta counter 106 may then increment the last value of the snapshot delta count by the volume of data modified. For instance, if the last value of the snapshot delta count is 1.8%, say, 100 Megabyte (MB) and the volume of data modified during the new transaction is 30 MB, then the delta counter 106 may add 30 MB to 100 MB to compute the updated value of the snapshot delta count as 130 MB, i.e., 2.3%.

The updated value of the snapshot delta count is subsequently used by the snapshot updating module 108 to determine if a new snapshot has to be created. In one example, the snapshot updating module 108 may compare the updated value of the snapshot delta count with the corresponding threshold value. As previously described, the threshold value specifies one of the predetermined volume of data modified and the predetermined number of transactions. For instance, the threshold value for creating a new snapshot may be set as 100 transactions or 2% volume of data, i.e., 2% change in volume of data since last snapshot creation.

The snapshot updating module 108 may compare the updated value of the snapshot delta count with the corresponding threshold value to determine if the new snapshot has to be created. On determining the updated value of the snapshot delta count to be greater than the corresponding threshold value, the snapshot updating module 108 may create the new snapshot. The snapshot updating module 108 may further save the new snapshot in the snapshots 128. Upon creating the new snapshot, the snapshot updating module 108 may reset the corresponding snapshot delta count to zero. In case the snapshot delta count is less than the threshold value, the snapshot updating module 108 may indicate the delta counter 106 to continue tracking the data modifications in the storage device 110.

Further, the system 102 may use the updated value of the snapshot delta count for managing the existing snapshots 128. In one example, the system 102 may manage the existing snapshots by dynamically performing snapshot actions, such as creating a replicated copy of the snapshots, creating a backup of the snapshots, and expiring the snapshots based on one or more predefined conditions. For instance, each snapshot action is dynamically performed when a snapshot delta value corresponding to the snapshot action crosses a corresponding threshold value.

In one example, one or more snapshot delta values are utilized to determine when the corresponding snapshot action has to be performed. The snapshot delta value indicates the volume of data modified or the number of transactions occurred since creation of a reference snapshot. The reference snapshot is a snapshot having image of data in reference to which the volume of data modification is being determined. The snapshot delta values include the snapshot delta count, a snapshot-replicate value, a snapshot-backup value, and a snapshot-expire value. As previously described, the snapshot delta count is used to determine if a new snapshot has to be created. The snapshot-replicate value is used to determine if a replicated volume snapshot of the reference snapshot has to be created. The snapshot-backup value is used to determine if the reference snapshot have to be added to a backup disk, such as a backup partition of a storage device, say, the storage device 110 of the system 102. The snapshot-expire value is used to determine if the reference snapshot has to be deleted.

In one example, the snapshot updating module 108 may compute the snapshot delta values based on the updated value of the snapshot delta count and a delta reset count. The delta reset count indicates number of times the snapshot delta count has been reset since creation of the reference snapshot. In one example, the delta reset count is computed by the delta reset counter 122. On determining the snapshot delta count to have been reset, the delta reset counter 122 may increment a last value of the delta reset count by a numerical value of one to obtain an updated value of the delta reset count. For instance, since the creation of a snapshot, i.e., the reference snapshot, the snapshot delta count has been reset twice, including the current reset, then the value of the delta reset count will be equal to numeric value "two". The delta reset counter 122 may save the value of the delta reset count in the delta reset count 130.

The snapshot updating module 108 may subsequently use the updated value of the snapshot delta count and the delta reset count to compute an updated snapshot delta value. In one example, the updated snapshot delta value may be equal to a value of a cumulative function of the updated value of the snapshot delta count and the delta reset count. For instance, if the value of the delta reset count is two, the updated value of the snapshot delta count is equal to 5%, and the snapshot delta count is reset after every 10% change in volume of data, then the snapshot updating module 108 may determine that updated value of the snapshot delta count is equal to 25%.

The snapshot updating module 108 may compute the updated value of each of the snapshot delta value, i.e., the snapshot-replicate value, the snapshot-backup value, and the snapshot-expire value upon occurrence of the new transaction. In one example, the snapshot updating module 108 may compute the updated snapshot delta values in a predefined order defined based on a corresponding threshold value and the snapshot action that has to be performed based on the updated snapshot delta value. For instance, once the reference snapshot has been created, the snapshot updating module 108 may initially start computing the snapshot-replicate value upon the occurrence of every new transaction. The snapshot updating module 108 may compute the snapshot-replicate value based on the updated value of the snapshot delta count and the delta reset count. Once the snapshot-replicate value crosses the corresponding threshold value and the replicated volume snapshot of the reference snapshot is created, the snapshot updating module 108 may start computing the snapshot-backup value. The snapshot updating module 108, in such a case may assign the value of a last snapshot-replicate value as an initial snapshot-backup value. The snapshot updating module 108 may thus update the snapshot delta value upon occurrence of each transaction.

The updated snapshot delta value is subsequently used by the snapshot updating module 108 to determine if the snapshot action has to be performed. In one example, the snapshot updating module 108 may compare the updated snapshot delta value with the corresponding threshold value. As previously described, the threshold value specifies one of the predetermined volume of data modified and the predetermined number of transactions. Further, a separate threshold value may be predetermined for each of the snapshot action. For instance, the threshold value for creating a replicated volume snapshot of the reference snapshot may be set as 1000 transactions or 20% volume of data, i.e., 20% change in volume of data with respect to the reference snapshot. The threshold value for creating a backup of the reference snapshot may be set as 3000 transactions or 60% volume of data, i.e., 60% change in volume of data with respect to the reference snapshot. The threshold value for expiring the reference snapshot may be set as 5000 transactions or 80% volume of data, i.e., 80% change in volume of data with respect to the reference snapshot. The percentage of delta change is calculated using delta counter 106 and snapshot updating module 108.

On determining the updated snapshot delta value to be greater than the corresponding threshold value, the snapshot updating module 108 may perform the corresponding snapshot action. For instance, the snapshot updating module 108 may create the replicated volume snapshot of the reference snapshot if the snapshot-replicate value is greater than the corresponding threshold value. In one example, the snapshot updating module 108 may create the replicated volume snapshot of the reference snapshot in a server (not shown in the figure) remotely connected to the system 100 through a communication network.

Further, the snapshot updating module 108 may add the reference snapshot to a backup disk (not shown in the figure) connected to the system 102 if the snapshot-backup value is greater than the corresponding threshold value. The snapshot updating module 108 may further expire and delete the reference snapshot if the snapshot-expire value is greater than the corresponding threshold value.

Further, in one example, the snapshot updating module 108 may create the new snapshot upon occurrence of a snapshot update condition. In one example, the snapshot update condition is at least one of number of errors detected in the storage device 110 being greater than a predetermined error threshold; occurrence of a change in characteristics of existing snapshots saved in the storage device 110; and number of the existing snapshots being less than a minimum snapshot threshold. To determine the occurrence of the snapshot update condition, the snapshot updating module 108 may monitor performance of the storage device 110 and other hardware components connected to the storage device 110.

In one example, the snapshot updating module 108 may determine occurrence of error in the storage device 110 using SCSI commands received by the storage device 110. A low level of SCSI commands may indicate an error in the storage device 110. In another example, the snapshot updating module 108 may determine occurrence of error using other commands sent to the storage device 110 or array firmware of the system 102 to determine perceived or actual error rates.

Figure 2:
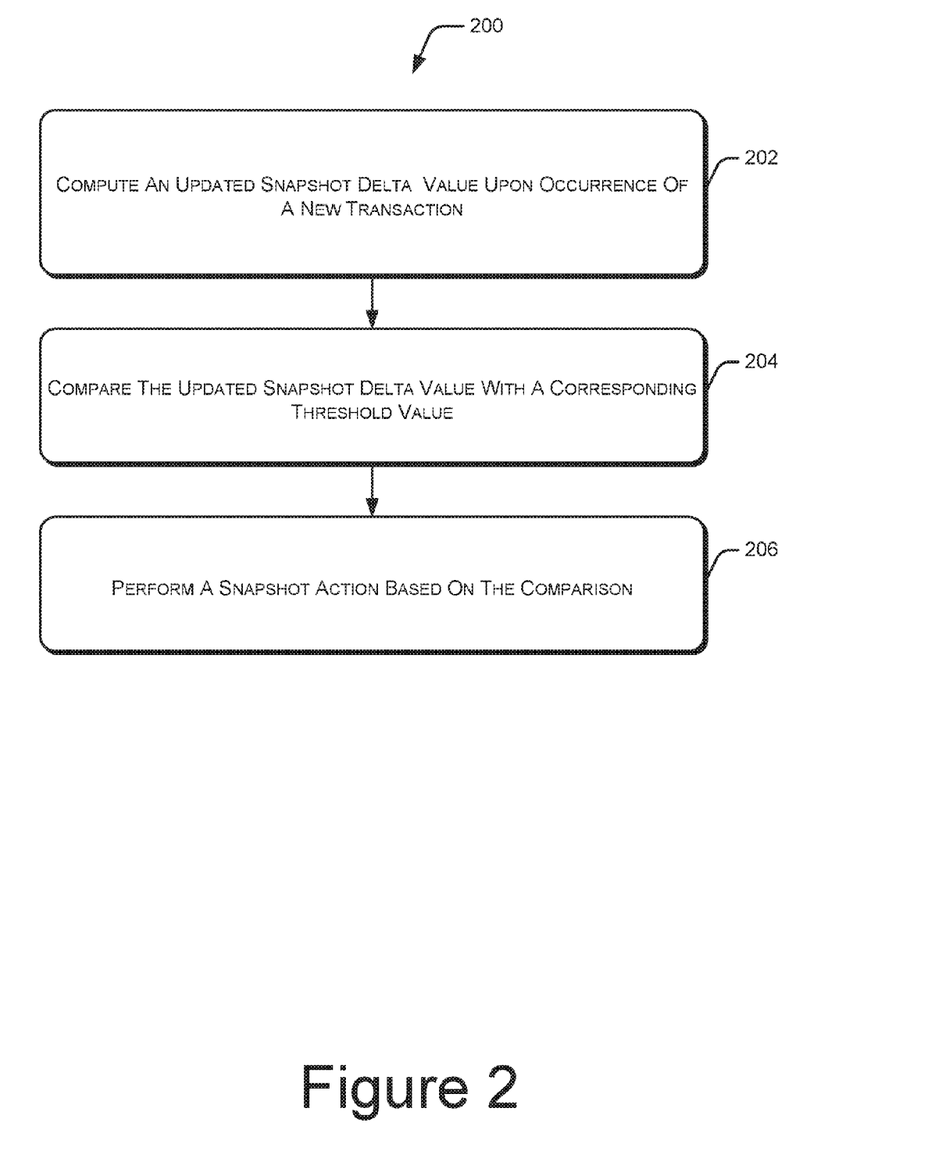
FIG. 2 illustrates an example method for snapshot creation, in accordance with an example of the present subject matter.
Figure 3:
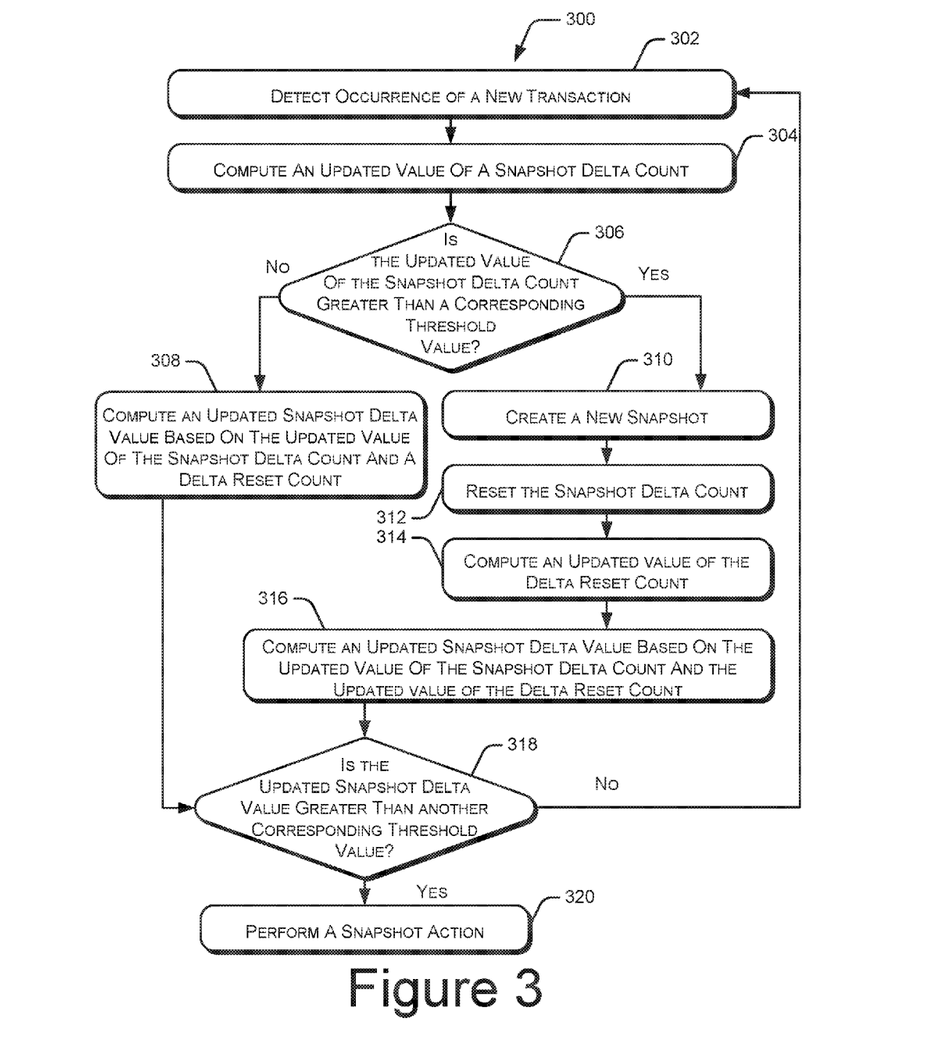
FIG. 3 illustrates another example method for snapshot creation, in accordance with an example of the present subject matter.

FIGS. 2 and 3 illustrate example methods 200 and 300, respectively, for snapshot creation, in accordance with an example of the present subject matter. The order in which the methods are described is not intended to be construed as a limitation, and any number of the described method blocks may be combined in any order to implement the aforementioned methods, or an alternative method. Furthermore, the methods 200 and 300 may be implemented by processing resource or computing device(s) through any suitable hardware, non-transitory machine readable instructions, or combination thereof.

It may also be understood that the methods 200 and 300 may be performed by programmed computing devices, such as the system 102 as depicted in FIGS. 1(*a*) and 1(*b*). Furthermore, the methods 200 and 300 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, the methods 200 and 300 are described below with reference to the system 102 as described above, other suitable systems for the execution of these methods can be utilized. Additionally, implementation of these methods is not limited to such examples.

Referring to FIG. 2, at block 202, updated snapshot delta value is computed. In one example, the updated snapshot delta value is computed upon occurrence of a new transaction. The new transaction is a data modification operation performed on data blocks of a storage device, for example, the storage device 110. Further, the snapshot delta value indicates at least one of volume of data modified since creation of a reference snapshot and number of transactions performed since the creation.

At block 204, the updated snapshot delta value is compared with a corresponding threshold value. The threshold value is at least one of a predetermined volume of data modified and a predetermined number of transactions.

At block 206, a snapshot action is performed based on the comparison. In one example, upon determining the updated snapshot delta value to be greater than the corresponding threshold value, the system 102 may perform a snapshot action corresponding to the snapshot delta value.

Referring to FIG. 3, at block 302, occurrence of a new transaction is detected. The new transaction is a data modification operation performed on data blocks of a storage device, for example, the storage device 110. In one example, occurrence of the new transaction is determined based on a small computer system interface (SCSI) request received from an operating system of a computing system, for example, the system 102.

At block 304, an updated value of a snapshot delta count is computed. The value of a snapshot delta count indicates at least one of volume of data modified since a last reset of the snapshot delta count and number of transactions performed since the last reset. In one example, the system 102 may compute the updated value of the snapshot delta count by incrementing a last value of the snapshot delta count by one of the volume of data modified and number of transactions currently occurred to obtain the updated value of the snapshot delta count.

At block 306, it is determined whether an updated value of the snapshot delta count is greater than a corresponding threshold value. The threshold value is at least one of a predetermined volume of data modified and a predetermined number of transactions. For example, in case the updated value of the snapshot delta count is less than a corresponding threshold value, ('No' path from block 306), the system computes an updated snapshot delta value based on the updated value of the snapshot delta count and a delta reset count at block 308. The delta reset count indicates number of times the snapshot delta count has been reset since creation of a reference snapshot.

In case the updated value of the snapshot delta count is more than the corresponding threshold value, ('Yes' path from block 306), the system creates a new snapshot at block 310.

At block 312, the snapshot delta count is reset. In one example, the snapshot delta count is reset by the snapshot updating module 108 of the system 102.

At block 314, an updated value of the delta reset count is computed. In one example, a delta reset counter, such as the delta reset counter 122 of the system 102 computes the updated value of the delta reset count. The updated value of the delta reset count is obtained by incrementing a last value of the delta reset count by a numerical value of one.

At block 316, an updated snapshot delta value is computed based on the updated value of the snapshot delta count and the updated value delta reset count. In one example, the snapshot updating module 108 of the system 102 computes the updated snapshot delta value.

At block 318, it is determined whether the updated snapshot delta value is greater than another corresponding threshold value. The threshold value is at least one of a predetermined volume of data modified and a predetermined number of transactions. For example, in case the updated snapshot delta value is less than a corresponding threshold value, ('No' path from block 318), the system continues detecting occurrence of new transactions at block 302.

In case the updated snapshot delta value is greater than a corresponding threshold value, ('Yes' path from block 318), the system performs a snapshot action at block 320. Examples of the snapshot action include, but are not limited to, creating a new snapshot, creating a replicated volume snapshot of the reference snapshot, creating a backup of the reference snapshot, and expiring the reference snapshot.

Figure 4:
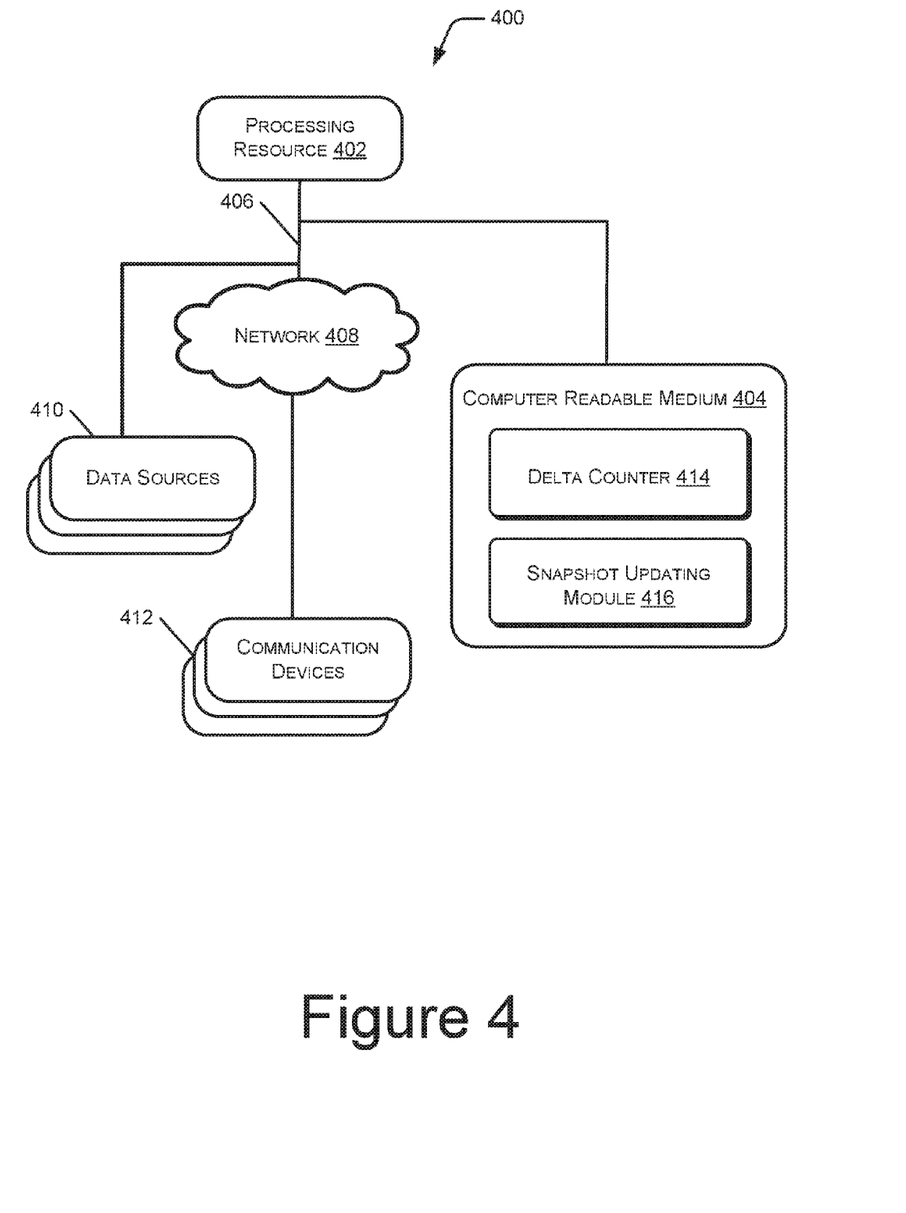
FIG. 4 illustrates an example network environment implementing a non-transitory computer readable medium for snapshot creation, according to an example of the present subject matter.

FIG. 4 illustrates an example network environment 400 for snapshot creation, according to an example of the present disclosure. The system environment 400 may comprise at least a portion of a public networking environment or a private networking environment, or a combination thereof. In one implementation, the system environment 400 includes a processing resource 402 communicatively coupled to a computer readable medium 404 through a communication link 406.

For example, the processing resource 402 can include one or more processors of a computing device for dynamic snapshot creation and management. The computer readable medium 404 can be, for example, an internal memory device of the computing device or an external memory device. In one implementation, the communication link 406 may be a direct communication link, such as any memory read/write interface. In another implementation, the communication link 406 may be an indirect communication link, such as a network interface. In such a case, the processing resource 402 can access the computer readable medium 404 through a network 408. The network 408 may be a single network or a combination of multiple networks and may use a variety of different communication protocols.

The processing resource 402 and the computer readable medium 404 may also be coupled to requested data sources 410 through the communication link 406, and/or to communication devices 412 over the network 408. The coupling with the requested data sources 410 enables in receiving the requested data in an offline environment, and the coupling with the communication devices 412 enables in receiving the requested data in an online environment.

In one implementation, the computer readable medium 404 includes a set of computer readable instructions, implementing a delta counter 414 and a snapshot updating module 416. The set of computer readable instructions can be accessed by the processing resource 402 through the communication link 406 and subsequently executed to process requested data communicated with the requested data sources 410 in order to facilitate dynamic snapshot creation and management. When executed by processing resource 402, the instructions of delta counter 414 may perform the functionalities described above in relation to the delta counter 106. When executed by processing resource 402, the instructions of the snapshot updating module 416 may perform the functionalities described above in relation to the snapshot updating module 108.

For example, upon occurrence of a new transaction, the delta counter 414 may compute an updated value of a snapshot delta count. As previously described, the new transaction is a data modification operation performed on data blocks of a storage device of the communication devices 412. In one example, the delta counter 414 may detect the occurrence of the new transaction based on a small computer system interface (SCSI) request received from an operating system of the communication devices 412.

Further, the value of a snapshot delta count indicates at least one of volume of data modified since a last reset of the snapshot delta count and number of transactions performed since the last reset. In one example, to compute the updated value of the snapshot delta count, the delta counter 414 may increment a last value of the snapshot delta count by either the volume of data modified or the number of transactions occurred, to obtain the updated value of the snapshot delta count. The last value of the snapshot delta count is the most recent computed value of the snapshot delta count.

In order to compute a volume based snapshot delta count, the delta counter 414 may initially determine volume of data modified during the new transaction. Based on the volume thus determined, the delta counter 414 may increment the last value of the snapshot delta count by the volume of data modified. In order to compute a transaction based snapshot delta count, the delta counter 414 may increment the last value of the snapshot delta count by the number of transactions currently occurred, for instance, numeric value one.

The snapshot updating module 416 may subsequently compare the updated value of the snapshot delta count with a corresponding threshold value. As previously described, the threshold value is at least one of a predetermined volume of data modified and a predetermined number of transactions. The snapshot updating module 416 may compare the updated value of the snapshot delta count with the corresponding threshold value to determine whether the snapshot delta count is greater than the corresponding threshold value. For example, on determining the updated value of the snapshot delta count to be greater than the threshold value, the snapshot updating module 416 may create a new snapshot. Further, the snapshot updating module 416 may use the updated value of the snapshot delta count and a delta reset count to compute an updated snapshot delta value. The snapshot delta value indicates at least one of volume of data modified since creation of a reference snapshot and number of transactions performed since creation of the reference snapshot. The delta reset count indicates number of times the snapshot delta count has been reset since creation of the reference snapshot.

Further, the snapshot updating module 416 may compare the updated snapshot delta value with the corresponding threshold value to determine whether the updated snapshot delta value is greater than the corresponding threshold value. As previously described, the threshold value is at least one of a predetermined volume of data modified and a predetermined number of transactions. On determining the updated value of the snapshot delta count to be greater than the threshold value, the snapshot updating module 416 may perform a snapshot action. The snapshot action is at least one of creating a new snapshot if the snapshot delta value is a snapshot delta count; creating a replicated volume snapshot of the reference snapshot if the snapshot delta count is a snapshot-replicate value; adding the reference snapshot to a backup disk is the snapshot delta count is a snapshot-backup value; and deleting the reference snapshot if the snapshot delta count is a snapshot-expire value.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A method comprising:
upon occurrence of a new transaction, computing, with at least one processor, an updated snapshot delta value indicating an amount of data modified since creation of a reference snapshot or a number of transactions performed since creation of the reference snapshot, and wherein the new transaction includes a data modification operation;
comparing the updated snapshot delta value with a corresponding threshold value, wherein the threshold value is one of a predetermined amount of data modified or a predetermined number of transactions; and
performing a snapshot action based on a result of the comparison, wherein the snapshot action is at least one of: creating a new snapshot or creating a backup of the reference snapshot.

2. The method of claim 1, wherein the computing comprises:
increasing a value of a snapshot delta count based on the new transaction, wherein the value of the snapshot delta count indicates an amount of data modified since a reset of the snapshot delta count or a number of transactions performed since the reset; and computing the updated snapshot delta value based on the increased value of the snapshot delta count and a delta reset count, wherein the delta reset count indicates a number of times the snapshot delta count has been reset since creation of the reference snapshot.

3. The method as claimed in claim 2, comprising:

determining the increased value of the snapshot delta count to be greater than the corresponding threshold; and based on the determination:
creating the new snapshot;
resetting the snapshot delta count to zero; and
incrementing the delta reset count.

4. The method of claim 1, wherein creating the new snapshot comprises:
creating the new snapshot on a computer system comprising the at least one processor.

5. The method of claim 1, wherein creating new snapshot comprises:
creating the new snapshot on a device remotely connected to a computer system comprising the at least one processor.

6. A computing system comprising:
at least one processor; and
a computer-readable medium comprising instructions executable by the at least one processor to:
upon occurrence of a new transaction, compute an updated value of a snapshot delta count indicating at least one of an amount of data modified since a last reset of the snapshot delta count or a number of transactions performed since the last reset of the snapshot delta count, wherein the new transaction includes a data modification operation performed on data of the computing system;
compare the updated value of the snapshot delta count with a corresponding threshold value, wherein the threshold value specifies a predetermined amount of data modified or a predetermined number of transactions; and
on determining the updated value of the snapshot delta count to be greater than the corresponding threshold value, create a new snapshot.

7. The computing system as claimed in claim 6, the instructions executable by the at least one processor to:
determine an amount of data modified during the new transaction; and
compute the updated value of a snapshot delta count by increasing a prior value of the snapshot delta count by the amount of data modified by the new transaction.

8. The computing system as claimed in claim 6, the instructions executable by the at least one processor to:
compute an updated snapshot delta value based on the updated value of the snapshot delta count and a delta reset count, wherein the snapshot delta value indicates at least one of an amount of data modified since creation of a reference snapshot and a number of transactions performed since creation of the reference snapshot, and wherein the delta reset count indicates a number of times the snapshot delta count has been reset since creation of the reference snapshot; and
determine whether to perform a snapshot action based on the updated snapshot delta value.

9. The computing system as claimed in claim 8, wherein the snapshot action is one of creation of a replicated volume snapshot on a device remotely connected to the computer system, creation of a backup of the reference snapshot, or deletion of the reference snapshot.

10. The computing system as claimed in claim 6, the instructions executable by the at least one processor to:
determine the snapshot delta count to have been reset to zero; and
increment a value of a delta reset count, wherein the delta reset count indicates a number of times the snapshot delta count has been reset since creation of the reference snapshot.

11. The computing system as claimed in claim 6, the instructions executable by the at least one processor to:
determine occurrence of a snapshot update condition, wherein the snapshot update condition is at least one of:
a number of errors detected in a storage device being greater than a predetermined error threshold;
occurrence of a change in characteristics of the reference snapshot; and
a number of existing snapshots of the computing system being less than a minimum snapshot threshold; and
create the new snapshot upon occurrence of the snapshot update condition.

12. A non-transitory computer readable medium comprising computer readable instructions executable by at least one processor of a computing system to:
upon occurrence of a new transaction, compute an updated snapshot delta value indicating an amount of data modified, in a collection of data, since creation of a reference snapshot of the collection of data or a number of transactions performed on the collection of data since creation of the reference snapshot, wherein the new transaction includes a data modification operation performed on the collection of data;
compare the updated snapshot delta value with a corresponding threshold value that is a predetermined amount of data modified or a predetermined number of transactions; and
on determining the updated snapshot delta value to be greater than the corresponding threshold value, perform a snapshot action, wherein the snapshot action comprises at least one of:
creating a new snapshot; or
creating a backup of the reference snapshot.

13. The non-transitory computer readable medium of claim 12, the instructions comprising instructions executable by the at least one processor to:
increase a value of a snapshot delta count based on the new transaction, wherein the value of the snapshot delta count indicates an amount of data modified since a reset of the snapshot delta count or a number of transactions performed since the reset; and
compute the updated snapshot delta value based on the increased value of the snapshot delta count and a delta reset count, wherein the delta reset count indicates a number of times the snapshot delta count has been reset since creation of the reference snapshot.

14. The non-transitory computer readable medium of claim 12, the instructions comprising instructions executable by the at least one processor to:
determine the increased value of the snapshot delta count to be greater than the corresponding threshold; and
based on the determination:
create the new snapshot;
reset the snapshot delta count to zero; and
increment the delta reset count.

15. The non-transitory computer readable medium of claim 12, the instructions comprising instructions executable by the at least one processor to:

create the new snapshot on a device remotely connected to the computer system.

16. The non-transitory computer readable medium of claim 12, wherein the updated snapshot delta value is a snapshot delta count, and the instructions comprise instructions executable by the at least one processor to:
on determining the snapshot delta count to be greater than a first threshold value as the corresponding threshold value, create the new snapshot on the computer system.

17. The non-transitory computer readable medium of claim 16, the instructions comprising instructions executable by the at least one processor to:
on determining a snapshot-replicate value to be greater than a second threshold value that is greater than the first threshold value, create a snapshot on a device remotely connected to the computer system;
wherein the snapshot-replicate value indicates the amount of data modified, in the collection of data, since creation of the reference snapshot or the number of transactions performed on the collection of data since creation of the reference snapshot.

18. The non-transitory computer readable medium of claim 17, the instructions comprising instructions executable by the at least one processor to:
on determining a snapshot-backup value to be greater than a third threshold value that is greater than the second threshold value, create the backup of the reference snapshot;
wherein the snapshot-backup value indicates the amount of data modified, in the collection of data, since creation of the reference snapshot or the number of transactions performed on the collection of data since creation of the reference snapshot.

19. The non-transitory computer readable medium of claim 18, the instructions comprising instructions executable by the at least one processor to:
on determining a snapshot-expire value to be greater than a fourth threshold value that is greater than the third threshold value, delete the reference snapshot;
wherein the snapshot-expire value indicates the amount of data modified, in the collection of data, since creation of the reference snapshot or the number of transactions performed on the collection of data since creation of the reference snapshot.

* * * * *